INVENTOR:
Jean Fournet

June 29, 1971  J. FOURNET  3,589,977
METHOD OF AND APPARATUS FOR IMPARTING COMBINED
ROTATIONAL, PULSATORY, AND CIRCULATORY
MOVEMENTS TO A SUSPENSION OF FIBERS
Filed April 26, 1968  7 Sheets-Sheet 3

Fig. 4

INVENTOR:
Jean Fournet
BY Spencer & Kaye
Attorneys

INVENTOR:
Jean Fournet

United States Patent Office 3,589,977
Patented June 29, 1971

3,589,977
METHOD OF AND APPARATUS FOR IMPARTING COMBINED ROTATIONAL, PULSATORY, AND CIRCULATORY MOVEMENTS TO A SUSPENSION OF FIBERS
Jean Fournet, Saint-Romain-en-Gal, France, assignor to Societe d'Exploitation des Brevets Granofibre-Sebreg, Paris, France
Filed Apr. 26, 1968, Ser. No. 724,427
Claims priority, application France, Apr. 27, 1967, 104,408; Nov. 13, 1967, 127,919
Int. Cl. D21c 9/00
U.S. Cl. 162—9　　　　　　　　　　　　　　　　25 Claims

ABSTRACT OF THE DISCLOSURE

A method of producing generally spherical fibrous aggregates from a suspension of fibres in a liquid, in which the fibres are caused to rotate about themselves and in circulation to engender speed gradients therein, and in addition pulsatory movement is applied to the suspension to engender an ebb and flow therein. The apparatus includes an outer container with at least one rotor located therewithin and mounted for eccentric rotation to produce the ebb and flow therein.

---

This invention relates to a method of and apparatus for forming generally spherical fibrous aggregates.

A method of treating suspensions of fibres to form aggregates is already known from French Patent. No. 1,422,835 filed on Jan. 21, 1964 in the name of Centre Technique de l'Industries des Papiers, Cartons et Celluloses.

This method comprises placing the fibres in suspension in a liquid and subjecting the suspension to a slight turbulence by imparting a rotation movement thereto to engender speed gradients therein such that the fibres, caused to rotate about themselves and in circulation, which movements are different for different layers of fibres, ten to cling to the fibres of the adjacent layer on contact to form aggregates.

The aforesaid known treatment is generally followed by a separating and grading operation, then a draining operation and finally a drying operation. Fibrous aggregates are then obtained in which the fibres are relatively free and which have substantially isotropic properties. These aggregates are highly porous, very light and have a flexible and resilient consistency.

A main object of the present invention is to improve the aforesaid known method to increase its yield, reduce the time required to form the aggregates and to make the treatment continuous.

According to the present invention, the method consists of subjecting the suspension, in combination with the rotational movement, to a pulsatory movement to engender in addition an ebb and flow of the suspension.

In this method, the suspension may be subjected, in combination with the rotational and pulsatory movements, to a closed circulatory movement in a direction substantially perpendicular to that of the aforesaid movements.

It can be particularly advantageous in the method of the invention to induce aggregate forming movements independently in at least two suspensions and to take off a portion from one and transfer it to the other. Thus, when at least one of the suspensions is transfused by transfer of suspension, continuous manufacture of aggregates is obtained.

Combined rotational and pulsatory movements may be induced in the suspension to be transferred, whilst a simple rotational movement is induced in the other suspension, transfer of the first suspension into the second being preferably effected in the vicinity of the peak of a pulsatory wave.

A further object of the invention is to provide a pulsation aggregator apparatus for carrying out the aforesaid method.

According to this aspect of the invention, the apparatus comprises a vessel and an inner core defining between them a cavity to receive the fibrous suspension, one of the elements being driven in rotation and the surface of contact of at least one of the elements with the suspension having a polar radius which is variable with respect to the axis of rotation.

In a preferred embodiment, the vessel is horizontal and its internal suspension contacting surface is at least in part cylindrical, the core being a rotor whose external suspension contacting surface is cylindrical and eccentric with respect to the axis of rotation of the rotor which coincides with the geometrical axis of the vessel.

The rotor is hollow and forms a complementary inner container whose suspension contacting surface is a cylinder concentric with the geometrical axis of the outer vessel.

The invention also covers aggregate forming installations, including apparatus enabling the stages of the known method referred to above to be carried out, namely:

fibre forming means for forming free fibres from various substances and generally vegetable substances such, as wood;
a vessel in which the fibres are mixed with a suitable amount of liquid to obtain the suspension;
at least one aggregate forming aparatus in which the fibrous suspension is treated to form fibrous aggregates;
a grading apparatus for separating the aggregates from the liquid and loose fibres;
a draining apparatus for extracting a large part of the liquid contained in the aggregates;
a drying apparatus for dehydrating the aggregates more completely.

In the aforesaid installations the aggregate forming apparatuses are pulsation apparatuses of the invention. These installations are preferably of the continuously operating type and accordingly, in a first embodiment, several pulsation apparatuses are mounted in cascade, each outer vessel of these apparatuses having a lateral opening situated substantially at the level of the wave peaks and adapted to pour the suspension into the vessel downstream thereof.

In a second embodiment, at least two rotors are coupled in a single outer vessel, openings being disposed on the locus of a continuous flow path of the suspension through all the vessels, from an inlet to an outlet.

The flow path of the suspension can be obtained in this second embodiment by connecting the inner containers of at least two coupled rotors, either in series, or in parallel with the outer vessel.

In order that the invention may be more fully understood, some embodiments in accordance therewith will now be described, by way of example, with reference to the accompanying drawings, in which.

The following description concerns the aggregate forming pulsation apparatus of the invention whose operation describel below brings out clearly the improved method of the invention.

Figure 1:
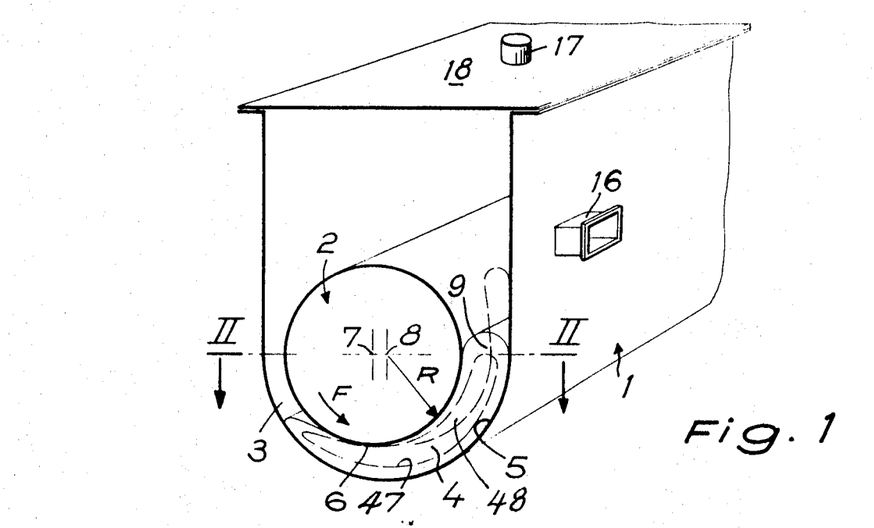
FIG. 1 is a perspective view of a first embodiment of the aggregate forming pulsation apparatus of the invention.
Figure 2:
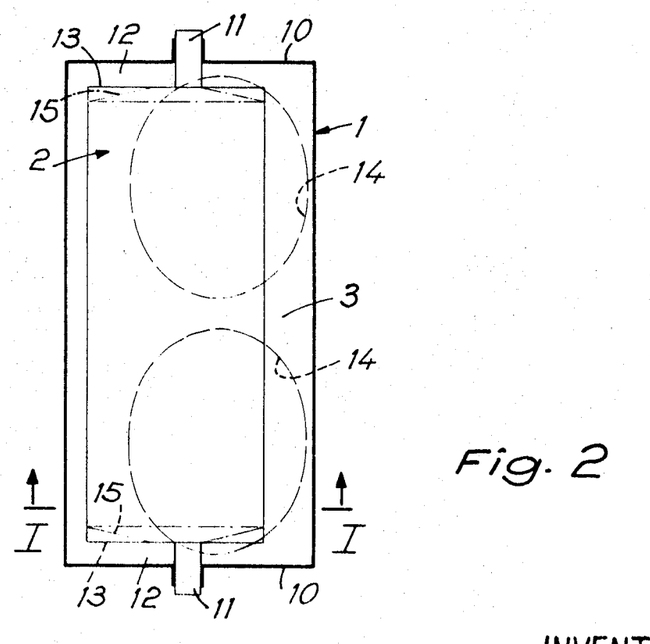
FIG. 2 is a sectional view along the line II—II of FIG. 1, which is sectioned along the line I—I of FIG. 2.

The aggregate forming apparatus comprises, in its simplest embodiment shown in FIGS. 1 and 2, a vessel 1 and a core 2 defining between them a cavity 3 for receiving the suspension 4 to be treated.

The vessel 1 is fixed and its inner surface 5, in contact with the suspension 4, is at least in part cylindrical. The core 2 is a rotor whose outer surface 6, which is also in contact with the suspension 4, is cylindrical. However, the geometrical axis 7 of the surface 6 of the rotor is eccentric with respect to the axis of rotation 8 of the latter, which axis coincides with the geometrical axis of the surface 5 of the vessel. The axes 7 and 8 are, moreover, horizontal.

This embodiment is in no way limitative, since numerous variations thereof can be made. In particular, the axes 7 and 8 can be vertical or inclined and, in this case, the inner surface 5 of the vessel 1 is completely cylindrical.

Whatever may be the orientation of these axes, the rotor 2, instead of being cylindrical, can have another shape of revolution, such as that of a truncated cone, of an outwardly curved solid whose generatrices are convex, or of an inwardly curved solid whose generatrices are concave, etc.

More generally, the essential characteristic of the rotor 2 is that the polar radius R of its outer surface 6 varies, so that during rotation of the rotor 2 this surface is periodically immersed in the suspension 4 and pushes it tangentially over a small distance. Thus, the section of the rotating surface 6 can be a curvilinear triangle, an ellipse or other shape centered or out of centre with respect to the axis of rotation 8.

Again, the salient feature of the pulsation apparatus is that two surfaces 5 and 6 are disposed opposite to each other to define the cavity 3 for receiving the suspension 4, at least one of these surfaces being caused to move in rotation and at least one having a polar radius variable with respect to the axis of rotation. Thus, the core 2 can be a fixed cylinder and the vessel 1 a cylinder eccentric with respect to the core and rotatably mounted about the axis of the latter. Again, the rotor 2 and the vessel 1 can be rotatably mounted to turn in opposite directions, one of these elements having a suspension contacting surface eccentric with respect to its axis of rotation. Other variations of this embodiment can also be made.

In every case, the pulsation apparatus of FIGS. 1 and 2 operates as follows:

First, rotation of the rotor 2 in the direction of the arrow F drags the fluid layers of the suspension 4 in contact with the surface 6 in the same direction. This dragging is transmitted gradually as one fluid layer slides towards the next. However, since the level of the suspension 4 at rest in the cavity 3 is below the upper level of the rotor 2, the dragging caused by the rotory produces a closed circulation of the fibres along the paths shown schematically at 47. Moreover, since the fluid layers slide relative to each other and to the fixed inner surface 5 of the vessel 1, rotational movements of the fibres on themselves are produced and superposed on their circulatory movement. The result is that the fibres come into contact and cling together during their mutual passage, to give rise to fibrous aggregates. This is, therefore, one manner of carrying out the method described in the aforesaid French Pat. No. 1,422,835.

To this effect, which would be strictly produced in this manner if the rotor 2 were concentric with the axis of rotation 8, is added a pulsation effect due to the fact that in reality the rotor 2 is eccentric with respect to the aforesaid axis of rotation. In effect, during this rotation, the thickness of the cavity 48 and thus, the pulsatory movement vary periodically at a frequency equal to the angular speed of the rotor expressed as the number of turns per unit time. Consequently, there is observed a pulsatory movement of the end wave 9 of the suspension similar to an ebb and flow. This becomes lower as it widens and rises as it becomes narrower at the frequency of rotation of the rotory, which effect is, moreover, accompanied by splashing. In every case, the pulsatory movement imparted to the suspension combines with the aforesaid circulatory and rotational movements of the fibres. It appears that the effect of the pulsatory movement is to periodically accelerate the movement of those fibres in the vicinity of the rotating surface 6 and to decelerate those in the vicinity of the fixed surface 5.

When rotating surface 6 is centered with respect to the axis of rotation 8, the pulsatory movement has a frequency which is a multiple of the angular speed of the rotational movement expressed in revolutions per unit time.

It will be seen that the result is a decrease in the aggregate forming time and an improvement in the yield. Thus, treatment of a fibrous suspension in accordance with French Pat. No. 1,422,835 in a simple rotating vessel, which lasted about eight hours, has been reduced to about two hours for the same quantity of suspension in a pulsation apparatus as shown in FIGS. 1 and 2. Moreover, it was possible to obtain a yield of 83% as soon as initial trials were made, that is to say 83 kg. of anhydrous aggregates were obtained from 100 kg. of anhydrous paste manufactured by stripping the fibres from sea-pines.

In this respect, the importance of the quality of the fibre stripping in effecting good aggregation must be emphasised. In effect, the paste must only contain elementary fibres and practically no sticks may be present. A small proportion of fibre bundles can be tolerated in the paste.

The vessel 1 is closed by lateral walls 10 provided with bearings supporting the end journals 11 of the rotor 2. Free spaces 12 are formed between the fixed walls 10 and the ends 13 of the rotor. The suspension 4 thus fills not only the cavity 3, but also in part the free spaces 12, and is thus in contact in these spaces with the fixed walls 10. Consequently, the fibres of the suspension are subjected, in combination with the rotational movement and the pulsatory movement engendered directly by the rotor 2, to a circulatory movement in a direction substantially perpendicular to that of the aforesaid movements. This perpendicular circulation is very much slower than the rotational and pulsatory movements and it generally takes place along two closed paths 14 (FIG. 2). It is particularly important since it enables the fibres in each liquid layer to be renewed and ensures a better homogeneity of the aggregation.

In order to maintain the fibres and aggregates in circulation and prevent them from blocking the free spaces 12, the ends 13 of the rotor 2, instead of being straight, preferably have a truncated cone shape or are inwardly curved as shown at 15.

The pulsation apparatus of FIGS. 1 and 2 can be used in a discontinuously operating installation. In this case the vessel 1 is filled with a suspension to be treated and when the aggregation is finished, the vessel is emptied.

However, it seems to be more advantageous to use this vessel in a continuously operating aggregation installation. In such a case, several identical apparatuses are mounted in cascade. Each vessel of these respective apparatuses has a lateral opening 16 situated substantially at the level of the wave peak when the wave reaches its final flow path. Each apparatus is, moreover, provided with an inlet tube 17 in the cover 18 for example. The lateral opening 16 of each apparatus is thus connected to the inlet tube 17 of the apparatus situated downstream thereof. Thus, the fibrous suspension to be treated is poured, practically without interruption, through the inlet tube 17 of the first apparatus into the corresponding vessel 1. Once the formation of aggregates has commenced, the fibrous suspension pours from one vessel into the following vessel located below the opening 16, and this occurs each time that a wave 9 reaches the level of the opening. In these conditions the manufacture is continuous and stabilised. Moreover, the yield from the treatment is improved and the duration of the treatment is reduced, because the concentration of free fibres in the suspension can be maintained substantially constant, since the fibres which combine to form an aggregate are replaced by new fibres brought in with the transfer suspension.

Figure 3:
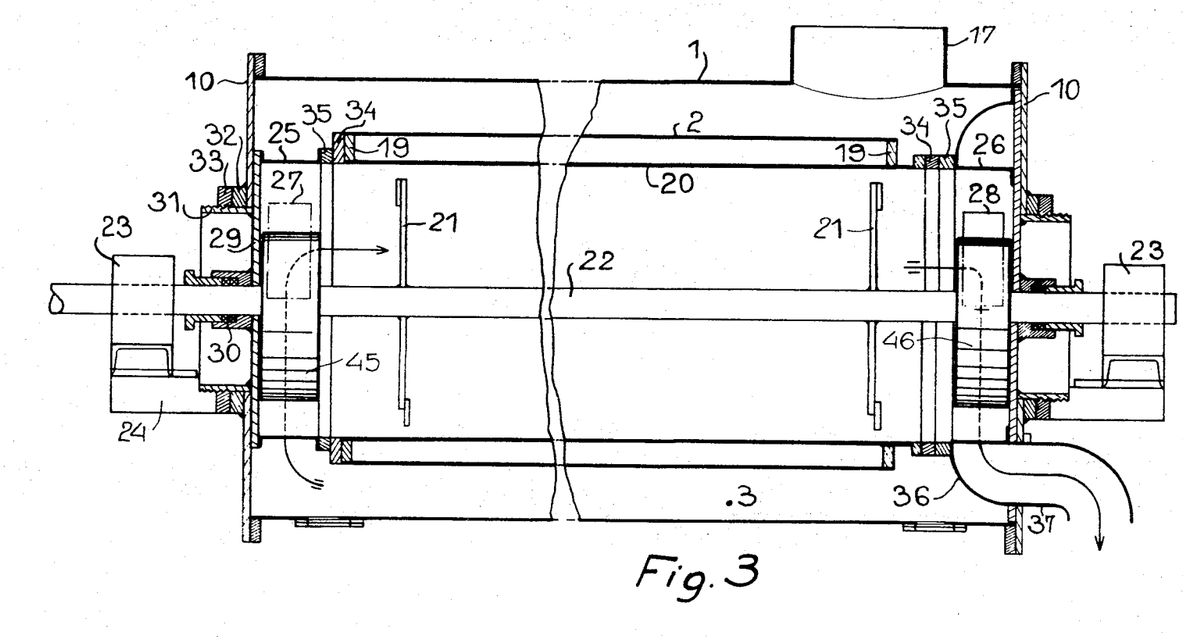
FIG. 3 is a similar view to that of FIG. 2 showing a second embodiment of the apparatus of the invention.
Figure 4:
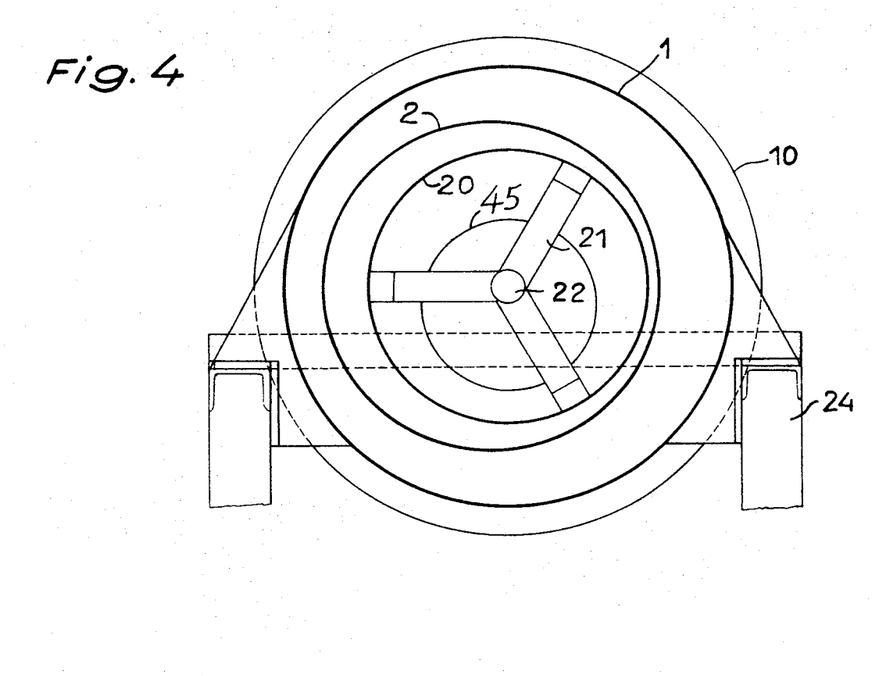
FIG. 4 is a section along the line IV—IV of FIG. 3.

A second embodiment of the apparatus is shown in FIGS. 3 and 4. It makes use of a particularly advantageous manner of carrying out the method, which consists of producing aggregate forming movements independently in at least two suspensions and taking suspension out of one for transfer to the other. In this application, one of the suspensions is agitated by combined rotational and pulsatory movements (in the manner described with reference to FIGS. 1 and 2), while the other suspension is agitated by means of simple rotational movements (in the manner described with reference to French Patent No. 1,422,835 and more particularly to FIG. 1 of this patent).

In this second embodiment, the vessel 1 is completely cylindrical, being provided with an inlet tube 17 and being closed at its ends by annular plates 10. The rotor 2 is cylindrical and made fast with a cylindrical tube 20 by means of eccentric rings 19. This tube is connected by means of radial arms 21 to a driving shaft 22 extending along the geometrical axis of the tube 20 and vessel 1.

As a result, the tube 20 constitutes a rotatable container concentric with the shaft 22 and the rotor 2 is an eccentric cylinder movable in synchronism with the aforesaid rotatable container in an accurately centred fixed vessel.

Under these conditions, the fibrous suspension in the cavity 3 between the fixed vessel 1 and the eccentric rotor 2 is treated according to the method hereinbefore described in connection with the first embodiment of FIGS. 1 and 2, in which method a pulsatory movement is combined with the other movements. By contrast, the suspension in the rotatable container 20 is treated solely in accordance with the method described in French Patent No. 1,422,835.

Numerous means may be used to remove periodically a certain amount of the suspension under treatment from the cavity 3 of the fixed vessel 1 and transfer it into the rotatable container 20. The preferred means described hereinafter has the advantage of being automatic and adjustable at least as regards its output.

The shaft 22 is supported by bearings 23 mounted on a chassis 24 to which is fixed the vessel 1. This shaft is coupled, moreover, to a driving device, such as an electric motor. It passes through the rotatable container 20, as well as through two annular distributors 25 and 26 extending between the end rings 19 of the rotor 2 and the end plates of the fixed vessel 1. These distributors are fixed, but angularly adjustable, so as to be able to cause variations, as a function of the selected rate of transfer, in the level of the lateral openings 27 and 28 therein which are similar to the opening 16 of the fixed vessel of FIGS. 1 and 2. For this purpose, each of the distributors 25 and 26 is secured to a frontal wall 29 applied against the corresponding plate 10 and surrounding the shaft 22, a seal 30 being interposed between the latter and the frontal wall. This wall is provided with a threaded sleeve 31 guided in rotation in a boss 32 of the plate 10 and cooperating with a locking nut 33. Thus, in order to adjust the level of the openings 27 and 28, it is sufficient to turn the sleeve 31 in the boss 32 and to lock the nut 33 when the desired level is reached.

A seal is provided between the rotor 2 and the distributors 25 and 26 and, for this purpose, the rotor is provided with a rotatable ring 34 bearing against a fixed ring 35.

The opening 27 of the distributor 25 enables the fibrous suspension contained in the cavity 3 of the fixed vessel 1 to be removed for transfer into the rotatable container 20, each time that a wave 9 of the suspension produced by a pulsatory movement arrives opposite to this opening. The opening 28 enables the surplus suspension contained in the rotatable container 20 agitated solely by a rotational movement, which surplus results from the transfer of suspension from the fixed vessel 1, to be removed and transferred to the next apparatus of the installation. For this transfer, a collector 36 is secured to the distributor 26, and this collector is situated in the fixed vessel 1. It leads through the opening 28 into the rotatable container 20 and is, moreover, connected to the downstream apparatus by an evacuation tube 37.

The intermittent flow of the suspension through the openings 27 and 28 of the distributors 25 and 26 is hindered by the accumulation of material in suspension against the fixed walls of these distributors. To prevent this accumulation and the formation of blockages, beaters are mounted on the driving shaft 22 opposite the openings 27 and 28. These beaters can be of any type, such as rigid arms or resilient blades, for example.

In fact, in the preferred embodiment shown in FIGS. 3 and 4, the beaters are eccentric cylinders 45 and 46, fixed by any suitable means to the shaft 22. They are preferably completely closed, but can also be open opposite the container 20. Their peripheral surfaces are preferably smooth, but they can also be perforated to create a certain amount of suction encouraging the clearing action.

The eccentricity of the cylinders 45 and 46 is, in the drawings, in quadrature with that of the rotor 2, so that the cylinders do not act at the same time as the maximum and minimum pulsatory movement created by the rotor. Nevertheless, there is nothing to prevent the eccentricities in question being in or out of phase.

In every case, the cylinders 45 and 46 produce, at every cycle, an intake and delivery effect through the openings 27 and 28, which effects are superposed in the vicinity of the distributors 25 and 26 on the aggregate forming effect in the vessels 1 and 20 and thus prevent the formation of blockages.

The downstream apparatus may be constituted by an aggregate forming apparatus, either of the rotational movement type (as shown in FIG. 1 of the aforesaid French Patent No. 1,422,835) or of the pulsatory movement type (such as shown in FIG. 1 of the present application), or of the type using first pulsatory movement and then rotational movement (such as described with reference to FIG. 3 of the present application). Conversely the downstream apparatus can also be constituted by a grading apparatus.

Third and fourth embodiments of the apparatus of the invention are shown in FIGS. 5 to 10. They make use of the aforesaid particular manner of carrying out the method, which consists of independently agitating at least two suspensions with aggregate forming movements and removing material from one to transfer it to the other. In this application the two suspensions are agitated with combined rotational and pulsatory movements, the mutual transfer being preferably effected by meeting of the waves 9 in the vicinity of their peaks.

In the third embodiment shown in FIGS. 5 to 8, the apparatus comprises a vessel 1 having two partially cylindrical channels 1.1 and 1.2 in which are rotatably mounted two eccentric rotors 2.1 and 2.2. As has been previously described with reference to FIG. 1, the suspension in the channel 1.1 is agitated by means of a rotational movement combined with a pulsatory movement and this, moreover, applies to the suspension in the channel 1.2. However, since the two channels 1.1 and 1.2 communicate with each other above a certain level, the suspensions can mix, i.e. a part of one is removed and transferred to the other and vice-versa. This transfer takes place in the common wave 9 which, because of the eccentricity of the rotors 2.1 and 2.2, periodically ebbs and flows (as can clearly be seen by comparing FIGS. 6 and 7). By virtue of this transfer, the duration of the aggregate forming time is decreased and the yield is increased.

Figure 5:
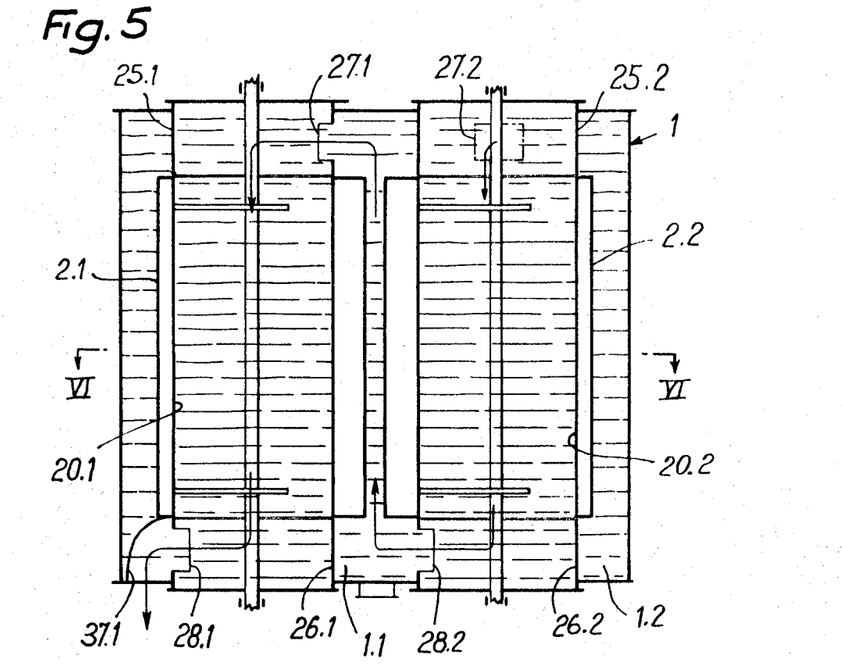
FIG. 5 is a view similar to that of FIG. 2 showing a third embodiment of the apparatus.
Figure 6:
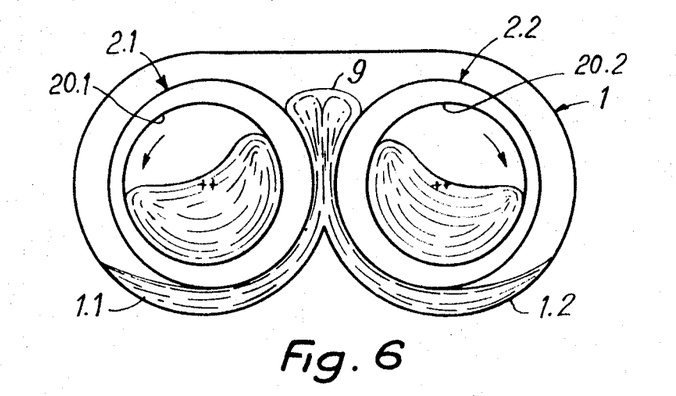
FIG. 6 is a section along the line VI—VI of FIG. 5
Figure 7:
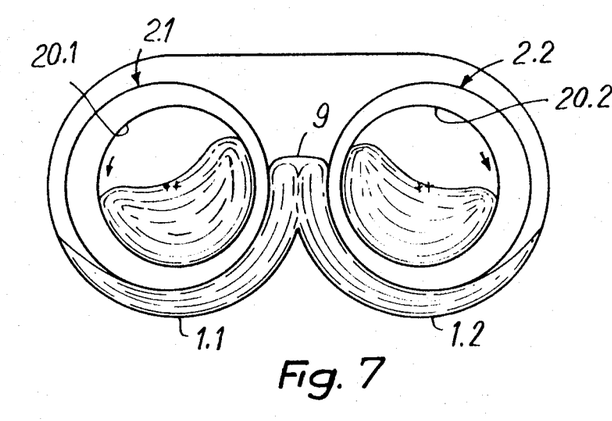
FIG. 7 is a similiar view to FIG. 6, these FIGS. 6 and 7 illustrating two characteristic stages in the operation of the apparatus.
Figure 8:
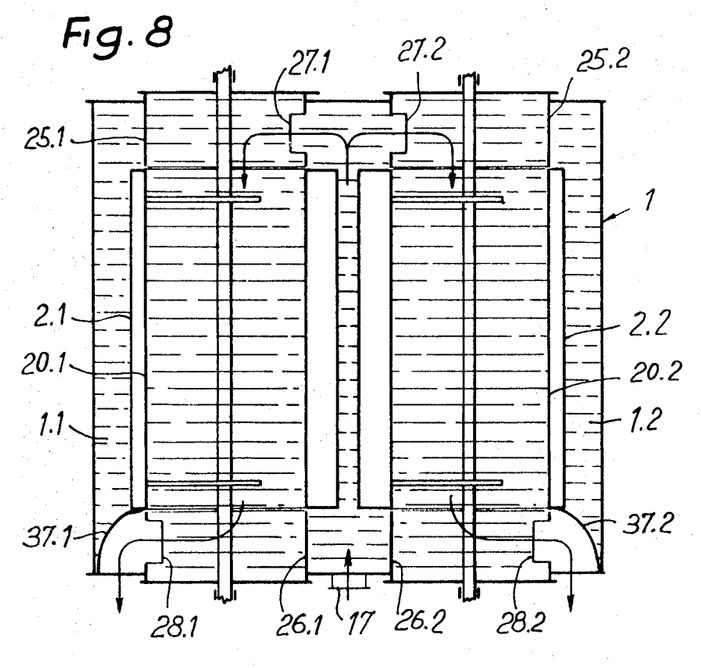
FIG. 8 is a similar view to that of FIG. 5 showing another manner of using the third embodiment.

The two pulsatory movements produced by the eccentric rotors 2.1 and 2.2 can be in phase and act in the same direction in the zone of contact of the suspensions. FIGS. 5 and 8 show, in effect, that the rotors are driven in rotation in opposite directions and that their eccentricities are opposed.

It is clear, however, that the two pulsatory movements can be out of phase with each other, e.g. in opposite phase. In this case, the eccentricities of the rotors 2.1 and 2.2 are located on the same side with respect to the axes of rotation. Moreover, the rotors can be rotated in the same direction.

The two aforesaid applications of the particular manner of carrying out the invention can be combined, and such a combination is shown in FIGS. 5 to 8. It consists, on the one hand, in agitating two suspensions with pulsatory movements, the mutual transfer being effected by contact of the waves in the vicinity of their peaks, and, on the other hand, in agitating two other suspensions with simple rotational movements, transfer of one of these suspensions in rotation being made to one of the suspensions in pulsatory movement.

To illustrate this, reference will be made hereafter to FIGS. 5 to 8. The rotors 2.1 and 2.2 are arranged in the same manner as in the second embodiment shown in FIG. 3. Thus the rotor 2.1 has an inner rotatable container 20.1 in permanent communication with end distributors 25.1 and 26.1. Similarly, the rotor 2.2 has an inner rotatable container 20.2 in permanent communication with end distributors 25.2 and 26.2.

Flow of suspension from one container to the other can be effected in series (FIG. 5). In this case the suspension is poured into the rotatable container 20.2 through an opening 27.2 in the distributor 25.2. It is treated in this rotating container and is directed longitudinally to the opening 28.2 of the distributor 26.2. It flows through this opening to the channel 1.2 of the fixed vessel 1. It is treated by pulsatory movement in the two channels 1.1 and 1.2, since a transfer is effected from one to the other at the wave formation point. The suspension flows lengthwise of the fixed vessel towards the opening 27.1 of the distributor 25.1. It enters the rotating container 20.1 periodically in small amounts and is treated therein by simple rotational movement as in the container 20.2. It flows along the whole length of this container and finally escapes through the opening 28.1 of the distributor 26.1 through the collector 37.1. This type of manufacture is continuous.

Flow of the suspension through the containers can also be effected in parallel (FIG. 8). In this case, the suspension is introduced into the vessel 1 between the two channels 1.1 and 1.2 by an inlet tube 17. It is treated by pulsatory movement in the two aforesaid channels and transferred from one to the other. It flows longitudinally towards the other end of the fixed vessel 1 enters the rotating containers 20.1 and 20.2 at each pulsation, through the openings 27.1 and 27.2 of the distributors 25.1 and 25.2. In the containers it is treated soley by rotational movement and flows longitudinally towards the opposite distributors 26.1 and 26.2. It then flows through the openings 28.1 and 28.2 of the latter towards the collectors 37.1 and 37.2.

Figure 9:
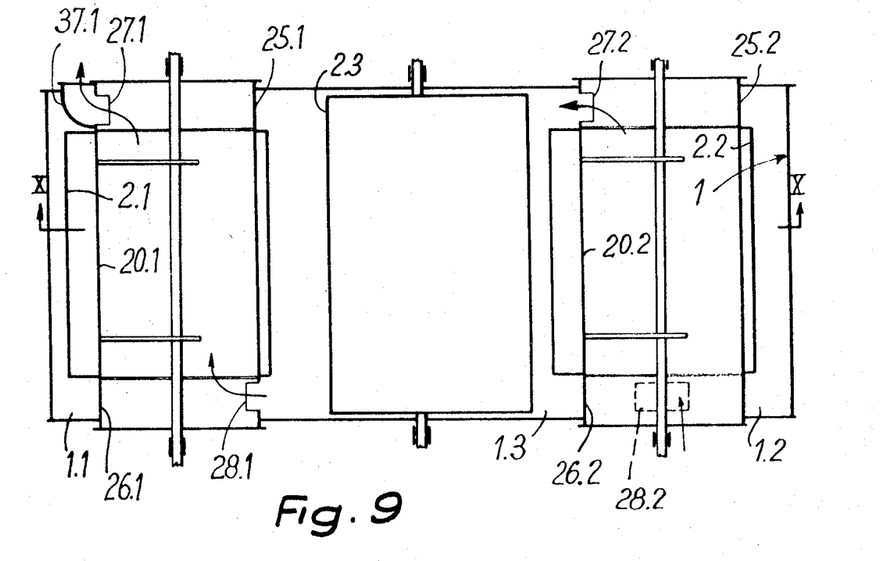
FIG. 9 is a view similar to that of FIG. 2 showing a fourth embodiment of the apparatus of the invention.
Figure 10:
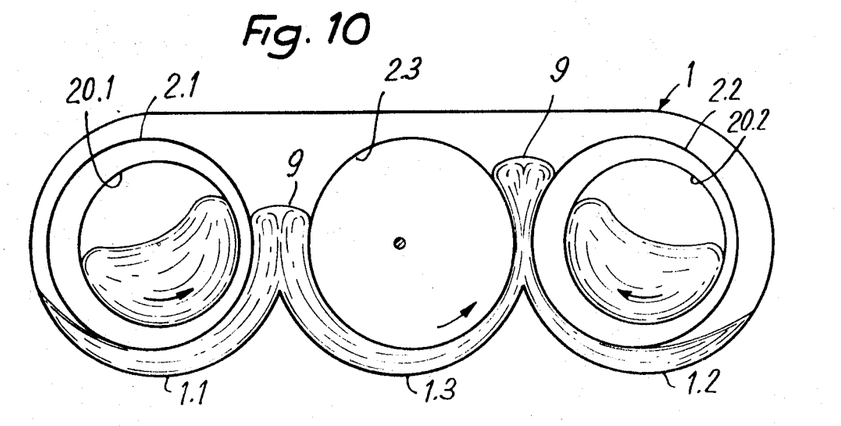
FIG. 10 is a schematic sectional view along the line X—X of FIG. 9.

A fourth embodiment is shown in FIGS. 9 and 10 to illustrate that other combinations of pulsatory and solely rotational movements are possible. In this fourth embodiment, the fixed vessel 1 has three channels 1.1 to 1.3. In the end channels 1.1 and 1.2 are housed, as in the third embodiment, eccentric rotors 2.1 and 2.2 fast with inner rotatable containers 20.1 and 20.2 interposed between the fixed end distributors 25.1, 26.1 and 25.2, 26.2. By contrast, an eccentric rotor 2.3 is mounted in the middle channel 1.3 of the fixed vessel 1, which rotor has no inner rotatable container as shown in FIG. 1. The suspension to be treated is introduced through the opening 28.2 of the distributor 26.2 into the rotatable container 20.2 where the formation of aggregates is commenced by rotational movement and longitudinal flow. The suspension then enters the vessel 1 through the opening 27.2 of the distributor 25.2. It is treated therein by pulsatory movement by means of rotors 2.2, 2.3, and 2.1 and flows by transfer from one channel to the next. The suspension then enters the rotatable container 20.1 through the opening 28.1 of the distributor 26.1, which opening is longitudinally opposed to the opening 27.2. The formation of aggregates is thus continued by means of a simple rotational movement and finishes in this container 20.1. The suspension is thereafter evacuated through the opening 27.1 of the distributor 25.1 and the collector 37.1.

Figure 11:
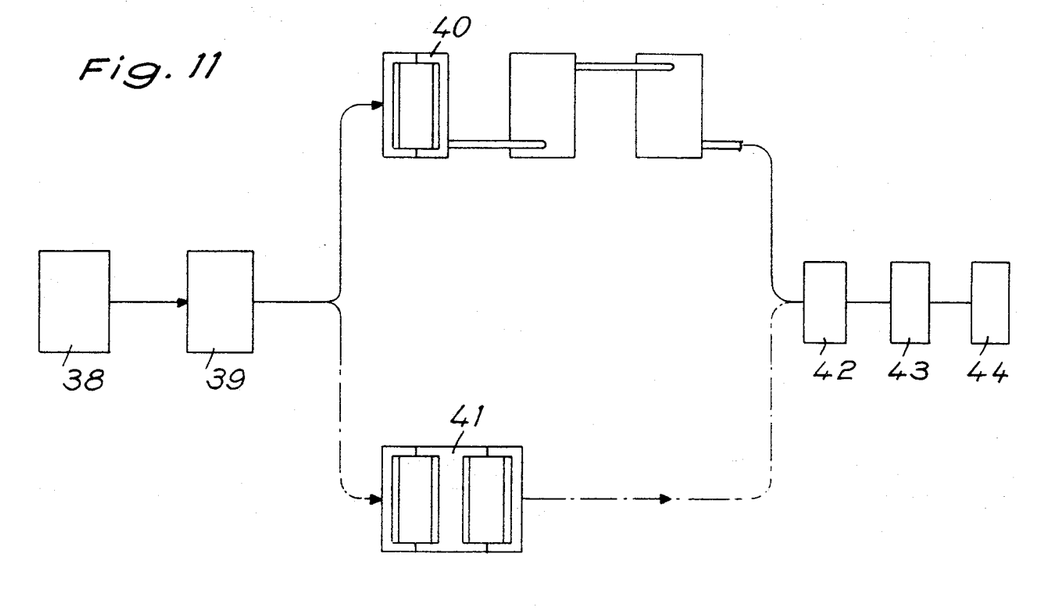
FIG. 11 is a diagram illustrating a continuously operating apparatus for manufacturing dry aggregates.

The various embodiments of aggregate forming apparatus described above can be integrated in a discontinuous, or preferably continuous, manufacturing installation. Such a continuous installation is shown in FIG. 11 and comprises at the input end a fibre forming apparatus 38 which continuously produces free fibres or bundles of fibres from strips of sea-pines for example. This apparatus feeds into a cavity 39 in which the fibrous suspension to be treated is measured, a homogeneous mixture being formed. The suspension is then directed:

Either to aggregate forming apparatuses 40 of the type shown in FIG. 1 or FIG. 3 mounted in cascade, Or to at least one continuously operating aggregate forming apparatus 41 of the type shown in FIG. 3, FIG. 5, FIG. 10 or others.

The suspension containing the aggregates and leaving the apparatuses is then directed to a separating and grading apparatus 42 and from there the aggregates thus separated are carried to a draining apparatus 43 and thence to a drying apparatus 44.

The invention is not limited to the embodiments described in detail and shown in the drawings, since various modifications can be made thereto without departing from the scope of the invention.

What is claimed is:

1. A method of forming fibrous generally spherical aggregates comprising (a) preparing a suspension of fibres in a liquid, (b) subjecting the suspension to slight turbulence by imparting a rotational movement thereto to engender speed gradients between plural layers thereof such that the fibres of each of the plural layers rotate about each other and in circulation and tend to cling to fibres of an adjacent layer upon contact therewith to form aggregates, the movement being different for different layers of fibres, and (c) also subjecting the suspension to a pulsatory movement, in combination with the rotational movement, to produce ebb and flow waves in the suspension.

2. A method according to claim 1 wherein the pulsatory movement is produced along a rotating surface and in the same direction as the rotational movement.

3. A method according to claim 1 wherein the pulsatory movement has a frequency equal to the angular speed of the rotational movement expressed in revolutions per unit time.

4. A method according to claim 1 wherein the pulsatory movement has a frequency which is a multiple of the angular speed of the rotational movement expressed in revolutions per unit time.

5. A method according to claim 1 wherein the suspension is subjected, in combination with the rotational and pulsatory movements, to a closed circulatory movement in a direction substantially perpendicular to that of the aforesaid movements.

6. A method according to claim 4 wherein at least two suspensions are independently agitated by movements which form aggregates, at least one suspension being agitated by said rotational and pulsatory movements, material being removed from a first of the two suspensions and transferred to the other.

7. A method according to claim 6 wherein the two suspensions are agitated and intermixed by combined pulsatory and rotational movements, the pulsatory movement being such that waves in the two suspensions contacct each other in the vicinity of their peaks, whereby a mutual transfer of suspension material is effected.

8. A method according to claim 7 wherein the pulsatory and rotational movements of the two suspensions are in phase.

9. A method according to claim 7 wherein the pulsatory and rotational movements of the two suspensions are in opposite phase.

10. A method according to claim 6 wherein the first suspension is agitated by combined pulsatory and rotational movements, while the other suspension is agitated by a simple rotational movement, said first suspension being transferred into said other in the vicinity of the pulsatory wave peak in said first suspension.

11. An apparatus for the formation of generally spherical fibrous aggregates from a liquid suspension of fibers which comprises means for imparting a crescent-shaped cross section to the suspension and maintaining the suspension in a closed circulating movement in a fixed direction, the angular velocity of the circulating movement varying from the center to the periphery of said suspension, and means cooperating therewith for imparting a pulsating movement to the suspension by periodically deforming at least a portion thereof and further propagating the closed circulating movement in the same direction.

12. An aggregate-forming apparatus comprising at least one apparatus for imparting pulses to a suspension of fibers, the apparatus having an outer container and a core therewithin defining between them a cavity for receiving and holding the suspension, which is a suspension of fibers in a liquid, at least one of the container and core being rotatable and comprising a rotatable surface which is rotatable about a fixed axis and contacts the suspension, the locus of points on the rotatable surface and in a plane perpendicular to the fixed axis varying in distance from said axis, said locus of points varying from imparting pulsatory and rotational movements to said suspension of fibers.

13. An apparatus according to claim 12 wherein the container of each pulsation apparatus is fixed and has a suspension contacting surface with directrices which are circular at least in part and centered on a geometrical axis, the core being a rotor mounted for rotation about the geometrical axis, said geometrical axis being that of at least one of said container and said core.

14. An apparatus according to claim 13, wherein the container of each pulsation apparatus is horizontal and the suspension contacting surface thereof is at least in part cylindrical, the rotor having a suspension contacting surface which is cylindrical, but eccentric with respect to the geometrical axis of the container.

15. An apparatcs according to claim 12 wherein the core in each pulsation apparatus is hollow and houses an inner container.

16. An apparatus according to claim 13 wherein the core of each pulsation apparatus is at least one rotor which forms an inner container having an inner suspension contacting surface which is a cylindrical concentric with the geometrical axis of the outer container.

17. An apparatus according to claim 16 wherein in each apparatus one rotor forms the inner container and extends between two fixed annular distributors with which the inner container directly communicates, the distributors being concentric with the geometrical axis of the outer container and having inlet and outlet means.

18. An aparatus according to claim 17 wherein in each pulsation apparatus each annular distributor includes means for angular adjustment and has a lateral means for communicating with the outer container.

19. An apparatus according to claim 17 wherein the one rotor is fixed to a driving shaft having at least one beater within each of the fixed annular distributors.

20. An apparatus according to claim 19 wherein each beater is constituted by an eccentric cylinder keyed to the rotor driving shaft.

21. An apparatus according to claim 12 wherein several pulsation apparatuses are mounted in cascade, the outer container of at least one of the apparatuses having means defining a lateral opening situated substantially at wave peak level and above the outer container of another of the apparatuses.

22. An apparatus according to claim 16 wherein at least two rotors are coupled together within the same outer container, said outer container having an inlet and an outlet, each rotor having two distributors, at least one distributor of one rotor having means defining an opening therein with the outer container and at least one other distributor having means defining an opening therein with the outlet.

23. An apparatus according to claim 22 wherein inner containers of at least two coupled rotors are connected in parallel with the outer container.

24. An apparatus according to claim 22 wherein inner containers of at least two coupled rotors are connected in series with the outer container.

25. An apparatus according to claim 17 wherein the inlet means defines a lateral opening in one of the two distributors and communicates with the cavity and the outlet means defines a lateral opening in the other of the two distributors and communicates with an outlet.

References Cited

UNITED STATES PATENTS

| | | | |
|---|---|---|---|
| 2,516,384 | 7/1950 | Hill et al. | 162—100 |
| 3,028,632 | 4/1962 | Coghill | 28—1.2 |
| 2,466,433 | 4/1949 | Klaassen | 241—221X |
| 3,224,685 | 12/1965 | Brack et al. | 241—142X |
| 3,506,536 | 4/1970 | Jacquelin | 162—1 |

OTHER REFERENCES

Norwegian Pulp and Paper Research Institute "Beating of Cellulose," Stephansen, Erik. August 1947, p. 207–21.

S. LEON BASHOVE, Primary Examiner

A. D'ANDREA Jr., Assistant Examiner

U.S. Cl. X.R.

8—156; 162—58, 100; 241—28, 142